United States Patent [19]
Dougherty et al.

[11] Patent Number: 5,574,077
[45] Date of Patent: Nov. 12, 1996

[54] MICROWAVE-ABSORBING MATERIALS CONTAINING POLAR ICOSAHEDRAL MOLECULAR UNITS AND METHODS OF MAKING THE SAME

[76] Inventors: Thomas K. Dougherty, 7600 Manchester #1417, Playa Del Rey, Calif. 90293; Norman H. Harris, 22931 8th St., Newhall, Calif. 91321; James R. Chow, 507 N. 2nd St. Unit "E", Alhambra, Calif. 91801; Brian M. Pierce, 22501 Sheffield Dr., Moreno Valley, Calif. 92557; David A. Whelan, 10212 Laramie Ave., Chatsworth, Calif. 91311

[21] Appl. No.: 159,277

[22] Filed: Nov. 30, 1993

Related U.S. Application Data

[62] Division of Ser. No. 870,023, Apr. 17, 1992, Pat. No. 5,317,058.

[51] Int. Cl.$^6$ .............................. G21F 1/10; C08K 3/38
[52] U.S. Cl. ..................... 523/137; 524/404; 524/490; 524/495; 522/75; 501/12; 252/315.6; 568/3
[58] Field of Search .................... 528/4–6; 526/239; 525/337; 523/137; 568/2–5; 524/494, 404, 490, 495; 522/75; 501/12; 252/315.6

[56] References Cited

U.S. PATENT DOCUMENTS

| | | | |
|---|---|---|---|
| 3,109,031 | 10/1963 | Goldstein et al. | 260/606.5 |
| 3,850,820 | 11/1974 | Korshak et al. | 528/4 |
| 4,235,987 | 11/1980 | Peters | 528/4 |
| 5,172,278 | 12/1992 | Tutt | 359/885 |
| 5,281,653 | 1/1994 | Thomann et al. | 524/496 |
| 5,296,536 | 3/1994 | Bartholomew | 524/490 |
| 5,381,1499 | 1/1995 | Dougherty et al. | 501/12 |

FOREIGN PATENT DOCUMENTS 2204994  8/1990  Japan.

OTHER PUBLICATIONS

"Chemistry of Decaborane–Phosphorous Compounds", Smith et al. Inorganic Chemistry, vol. 4, No. 1, pp. 107–111, 1965.

"The Dipole Moments of Boron and Carbon Brominated Carboranes" Inorg. Chem., vol. 6, No. 3, pp. 572–574, 1967. Maruca et al.

"Use of Dipole Moments to Determine the Structure of Halogen Derivatives of Ortho–and meta–Carboranes" Stanko et al.

Zhurnal Strukturno; Khimii 8, pp. 829–832, 1967 "Dipole Moments of Halogen Derivatives of Ortho–and Meta–Carboranes".

Echeistova et al. Zhurnal Strukturnol Khimii 8, pp. 833–834, 1967.

"Carborane Polymers". Schroeder, Polymer Preprints, vol. 13, No. 2, pp. 764–776, 1972.

"The Dipole Moments of the Isomers of Dicarbadecarborane", Laubengayer, Inorg. Chem. vol. 4, pp. 1513–1514, 1965.

"Glasses from aerogels" Phalippou, J. of Mat. Sci, pp. 3111–3117, 1990.

*Primary Examiner*—Tae Yoon

[57] ABSTRACT

A microwave-absorbing material composed of blends of polar icosahedral molecular units with a variety of host matrices, or with polymers with the units covalently bonded in a pendant manner to the polymer chain. Both blends and polymers must impart a high degree of orientational mobility to the units so that they can absorb microwave radiation. These materials employ orientationally mobile, polar icosahedral molecular units as the source of dielectric loss at microwave frequencies. Examples of these units are the polar carboranes (ortho- and meta-carborane), polar carboranes with electronegative and/or electropositive substituents, and polar "buckminsterfullerenes."

17 Claims, 9 Drawing Sheets

ORTHO

META

PARA

◉ = CARBON
○ = BORON

CHEMICAL STRUCTURE OF $(t\text{-}Bu\,C_5H_4N)_2\,Os\,O_4\,C_{60}$

○ = CARBON ATOM
⊖ = OXYGEN ATOM
$O_s$ = Osmium ATOM
N = NITROGEN ATOM
Bu BUTYL GROUP
H = HYDROGEN ATOM

MICROWAVE-ABSORBING MATERIALS CONTAINING POLAR ICOSAHEDRAL MOLECULAR UNITS AND METHODS OF MAKING THE SAME

This invention was made with Government support under Contract N00019-88-C-0208 awarded by the Department of the Navy. The Government has certain rights in this invention.

This is a division of application Ser. No. 07/870,230, filed Apr. 17, 1992, now U.S. Pat. No. 5,317,058.

BACKGROUND OF THE INVENTION

The present invention relates to the field of microwave energy absorbing materials, and more particularly to such materials which employ orientationally mobile, polar icosahedral molecular units as the source of dielectric loss at microwave frequencies.

A variety of host materials loaded with either carbon or ferrite-type particles comprise the great majority of microwave-absorbing materials currently in use. The carbon-loaded (or carbon) materials absorb microwave radiation through dielectric loss, while the ferrite-type-loaded (or ferrite materials absorb through magnetic loss. Although there have been significant improvements in the host matrices for the carbon and ferrite-type particles, there is a need for additional microwave-absorbing particles/clusters/molecules that can be incorporated into such host matrices.

This need is best stated by examining the deficiencies of the carbon and ferrite materials in regard to weight, mechanical strength, impedance matching, chemical tuning, and IR and visible transparency.

Because of their higher microwave absorptivities and better impedance-matching properties, the ferrite materials are generally preferred over the carbon materials. However, the ferrite materials are much heavier than the carbon materials. This difference remains an issue even though the ferrite materials can be applied as thinner layers than the carbon materials. Thus, other lightweight, microwave-absorbing materials are needed.

Both the ferrite and carbon materials are blends, and therefore possess poor mechanical strength. Microwave-absorbing polymers would be of great interest because their mechanical stability is generally much greater than that of blends.

A material with a high dielectric or a magnetic loss at microwave frequencies does not automatically make it a leading candidate as a microwave absorber. The reason is that most of the microwave radiation is reflected at the air-material interface, rather than absorbed, for high loss materials like electron-conductors. A large number of ingenious air-material impedance-matching strategies have been devised for carbon materials, e.g., loaded foams or multi-layer stacks with a different amount of carbon loading in each layer. The ferrite materials are rather special in that they come close to the case where $\mu=\epsilon$, which results in very low reflection at normal incidence. Additional air-material, impedance-matching strategies are always of interest for new microwave-absorbing materials, as well as for the established carbon and ferrite materials.

Chemical tuning refers to the possibility of modifying the microwave dielectric and/or magnetic properties of a microwave-absorbing material by changing the chemical structure of the material by varying the concentration of electron-donating or electron-withdrawing moieties, or other chemically-related alterations of the material. Both the carbon and ferrite materials are limited in regard to the chemical tuning of their dielectric and magnetic properties. Additional microwave-absorbing materials are needed that can be chemically tuned in regard to their dielectric and/or magnetic loss, and impedance matching.

Both the carbon and ferrite materials are opaque in the IR and visible spectral regions. Microwave-absorbing materials are needed that are transparent in these regions. Of course, this requirement is most relevant in the area of window applications.

Noble metal thin films and thin films made from doped wide band-gap semiconductors are widely used at present as microwave-reflecting coatings that are transparent in the visible spectral region. These coatings are well-characterized and can be applied to a variety of surfaces including silica glass and plastics. One drawback with these materials is that their electron conductivities make them opaque in the IR spectral region. If these materials are made non-conducting, as is the case for the zinc sulfide wide band-gap semiconductor, then transparency is obtained in both the IR and visible spectral regions, but no attenuation in the microwave spectral region. Narrow band-gap semiconductors, e.g., silicon, have the potential to serve as IR-transparent substrates into which microwave-attenuating circuit elements can be etched. This approach appears to be rather expensive at the present time.

Electron-conducting polymers have spectroscopic properties similar to the doped wide band-gap semiconductors, but have the advantage of polymer processibility. The low visible and IR transparencies of this polymer remain an issue.

It is therefore an object of the invention to provide a microwave energy absorbing material which has high dielectric loss, high mechanical strength, and is light-weight.

A further object is to provide a microwave energy absorbing material which is impedance-matchable to air.

Other objects include providing a microwave-energy absorbing material which has chemically-tunable dielectric properties, and/or which is IR-transparent, and/or which is transparent to visible light.

Such a material would be useful in the reduction of side-lobe reflections from surfaces in general, and in IR and visible windows requiring microwave absorption.

SUMMARY OF THE INVENTION

Polar dielectrics can be employed in accordance with this invention to provide a single material that is simultaneously (1) microwave-absorbing, (2) IR-transparent, and (3) visible-transparent. Water in the form of a hydrogel is a good example of such a polar dielectric, but its mechanical and thermal properties are not outstanding. The polar, icosahedral, carborane-containing materials are very attractive in that they have spectroscopic properties similar to those of water, but possess potentially better mechanical and thermal properties. Furthermore, the microwave, IR, and visible spectral properties of the carborane-containing materials have the potential of being chemically tuned.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The invention of a new microwave-absorbing material containing polar icosahedral units originates from the discovery that polycrystalline ortho- and meta-carborane have high dielectric loss at microwave frequencies and potentially high transparencies in the visible and infrared (IR) spectral regions.

Figure 1:
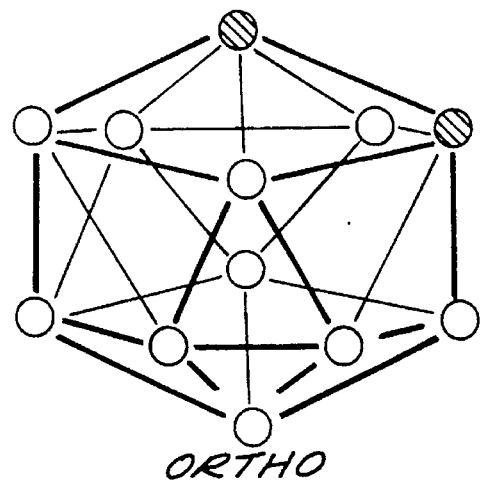
FIGS. 1–3 illustrate the icosahedral cage-like molecular structures of ortho-carborane, meta-carborane and paracarborane.
Figure 2:
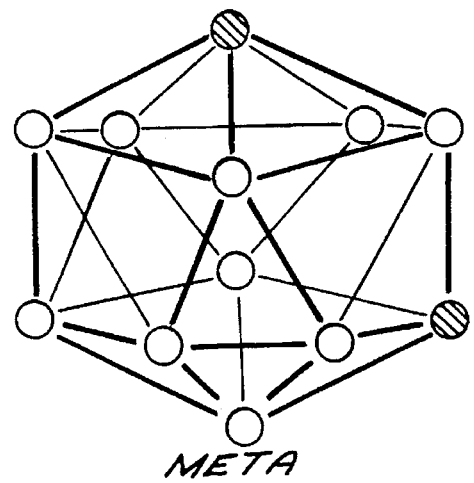
Figure 3:
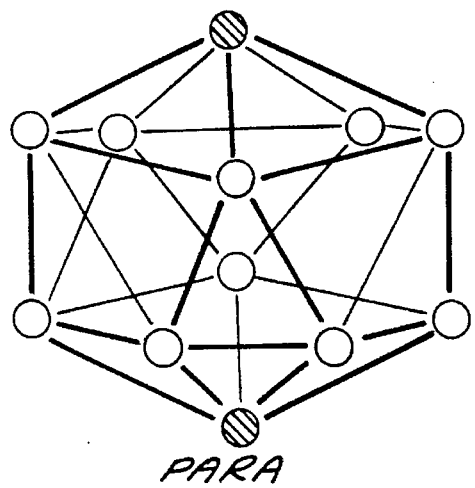

The icosahedral cage-like molecular structures of ortho-carborance (oCB) and meta-carborane (mCB) are shown in FIGS. 1–3, along with that of the para-carborane (pCB) isomer. Although not shown in FIGS. 1–3, each carbon and boron atom has one hydrogen atom bonded to it.

The microwave dielectric properties measured at room temperature for polycrystalline samples of oCB, mCB, and pCB are compared with those of liquid water in Table I.

The microwave dielectric properties for oCB and mCB are seen to be very large for polycrystalline polar dielectrics and compare well with those of liquid water. In contrast, the low microwave polarization response measured for pCB is typical of a solid composed of non-polar molecules. The structures of the carboranes shown in FIGS. 1–3 indicate that oCB and mCB should have large molecular dipole moments, while pCB should have no dipole moment. This distinction between pCB and the two polar carboranes is discussed in greater detail below with regard to the origin of their polarization responses at microwave frequencies.

The important conclusion that can be drawn from the data presented in Table I is that polycrystalline oCB and mCB are excellent microwave absorbers. Of particular interest is the result that the imaginary part of the dielectric constant ($\epsilon_i$) for oCB is about two times larger than the real part ($\epsilon_r$). This finding is significant because it makes the task of matching the impedance of air to that of the polycrystalline oCB and mCB surface less difficult.

The microwave dielectric properties of polycrystalline oCB and mCB make them strong candidates as microwave-absorbing materials. As to their visible and IR properties, the major electronic absorption band for the carboranes is in the ultra-violet spectrum ($\lambda_{max}$<250 82 m) like that for water ($\lambda_{max}$=165.5 nm; G. Herzberg, "Molecular Spectra and Molecular Structure. III. Electronic Spectra and Electronic Structure of Polyatomic Molecules," Van Nostrand, N.Y., 1966, pg. 585). Thus, like water, the carboranes have very little intrinsic absorptivity in the visible spectral region.

Figure 4:
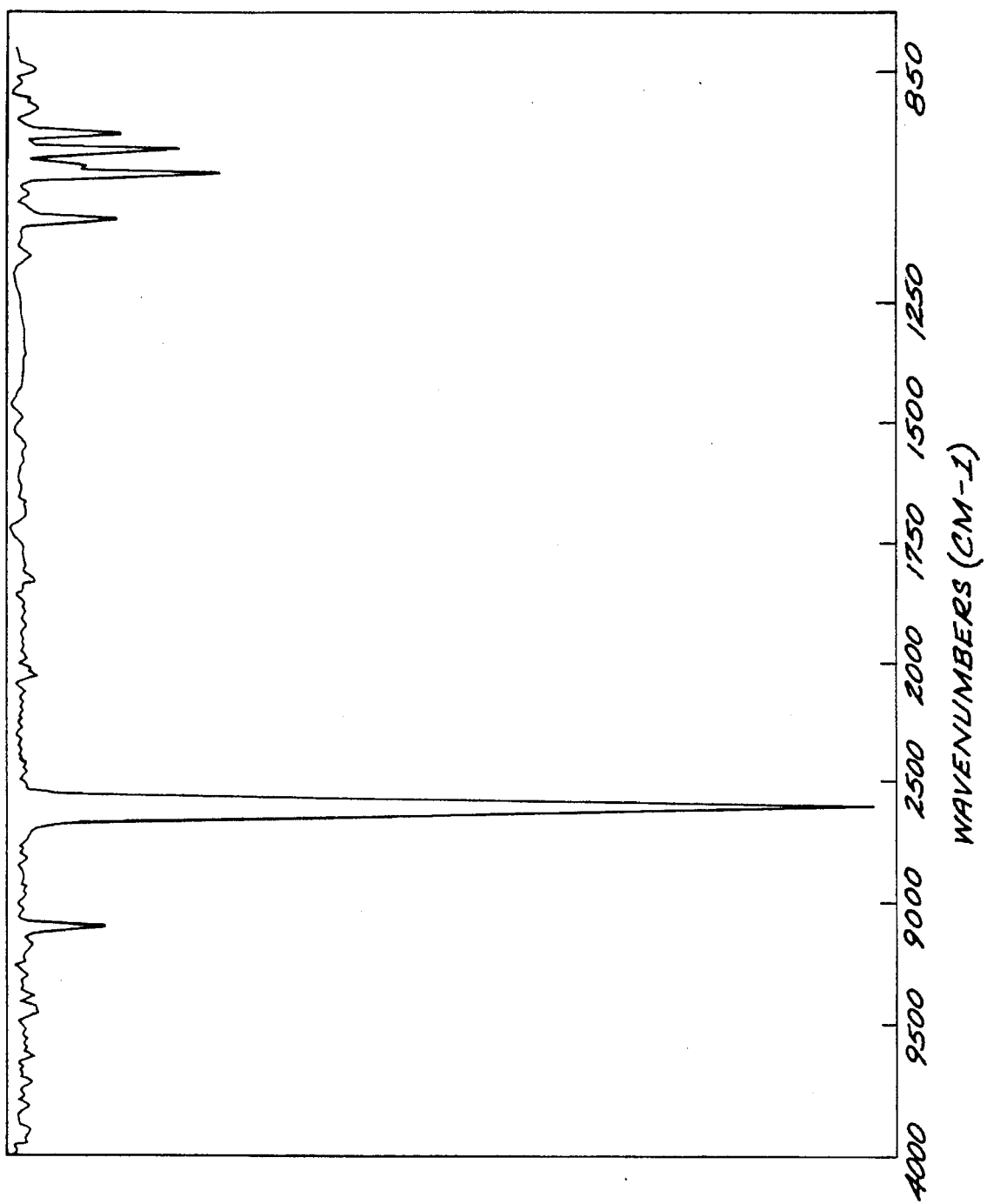
FIG. 4 illustrates an IR absorption spectrum for metacarborane dissolved in carbon tetrachloride solvent.

An IR absorption spectrum measured for mCB dissolved in carbon tetrachloride solvent is shown in FIG. 4. In the important IR spectral region of 3–5 μm (3333–2600 cm$^{-1}$), there is one absorption band of medium strength at ~3070 cm$^{-1}$ (~3.26 μm) that is due to the stretching vibration of the C—H bond, and one very strong absorption band at ~2600 cm$^{-1}$ (~3.84 μm) that arises from the stretching vibration of the B—H bond. In the important IR spectral region of 8–11 μm (1250–910 cm$^{-1}$), there are several absorption bands of medium strength that are primarily due to the stretching, bending, and twisting of the entire carborane cage structure. (T. A. Green, A. C. Switendick, and D. Erwin, *J. Chem, Phys.* 89, 6815 (1988)). The IR absorptivity of mCB in the 5–8 μm region (1000–1250 cm$^{-1}$) is very close to zero, which is opposite to the high IR absorptivity of water in this region. The oCB and pCB isomers have IR absorption spectra similar to that measured for mCB, with some slight shifts in the center frequencies of the absorption bands. (L. A. Leites and S. S. Buklalov, *Bull. Acad Sci. USSR Chem. Sci.* 38, 2079 (1989); and references therein.)

TABLE I

Measured microwave dielectric properties for ortho-, meta-, and para-carborane and water.

| Material | T(°C.)[b] | ν(GHz)[c] | $\epsilon_r$ | $\epsilon_i$ | α(dB/cm)[d] | Material Structure |
|---|---|---|---|---|---|---|
| ortho-carborane | 25 | 8.5 | 6.6 | 11.3 | 28 | Polycryst. Solid |
| meta-carborane | 25 | 8.5 | 4.8 | 3.5 | 12 | Polycryst. Solid |
| para-carborane | 25 | 8.5 | 2.5 | 0.02 | 0.1 | Polycryst. Solid |
| water | 25 | 10 | 55 | 40 | 46 | Liquid | a. Measurement for water taken from "Electronics Designers's Handbook," Second Edition, edited by L. J. Giacolleto, McGraw-Hill, New York, 1977, pg 2–47.
b. Measurement temperature.
c. Measurement frequency.
d. Absorptivity of the material.

The modest IR absorptivity measured for mCB in the 8–11 μm region indicates that an mCB-containing microwave absorber could be considered to be somewhat transparent in this spectral region. The high IR absorptivity measured for mCB in the 3–5 μm wavelength range could be addressed by substituting the hydrogen atoms in the molecule with the heavier deuterium atoms. This substitution would result in lower resonance frequencies for the stretching vibrations of the C—D and B—D bonds than those for the C—H and B—H bonds. In fact, the highly absorptive B—D stretching vibration would be shifted into the 5–11 μm region and the C—D vibration would be located near 4.4 μm. (L. A. Leites et al., id., and references therein.) Deuteration of the carboranes would have little or no effect on the absorption bands in the 8–11 μm wavelength range. Fortunately, these bands have medium IR absorptivities. Thus, it appears possible to synthesize carboranes with modest absorptivities in the important IR spectral regions of 3–5 μm and 8–11 μm. The extent to which these absorptivities should be minimized will depend on the thickness required for microwave absorption. Because the polycrystalline oCB and mCB solids are so absorptive in the microwave frequency range (see Table I), it could be possible to work with layer thicknesses small enough so that IR absorption is not a major concern.

The intrinsic, molecular absorptivities of the carboranes in the visible and IR spectral regions are either very low or have the potential of being adjusted to low values through slight modifications of the molecular structure. However, the IR and visible transparencies of carborane-containing microwave absorbers are not completely defined by their intrinsic, molecular absorptivities, but also by the scattering of IR and visible light. Polycrystalline oCB and mCB are white opaque solids because of the scattering of visible light at the interfaces between the crystalline domains. This scattering can be minimized by using single crystalline materials or by dispersing the carborane molecules in a host matrix that does not promote the aggregation of carborane molecules. The host matrices to be considered for the carboranes are described in detail below.

1. Origin of the Microwave Response.

Polycrystalline meta- and ortho-carborane are considered polar dielectrics. Polar dielectrics are materials consisting of molecular units with permanent dipole moments. The dipole moments of these units will attempt to align themselves with respect to an applied electromagnetic field oscillating at angular frequency ω. This alignment is opposed by the effects of thermal agitation and intermolecular interactions. The amount of alignment for a given applied electric field strength is related to the real part of the complex permittivity $\epsilon_r$, and the damping of this alignment is related to the imaginary part $\epsilon\epsilon_i$.

The damping of the electric-field-induced orientational motion of the molecular units in a polar dielectric can result in a significant dielectric loss in the microwave frequency range, which makes these materials of interest as microwave absorbers. Liquid water is a well-known example of a polar dielectric that is an excellent microwave absorber.

In the case of polycrystalline oCB and mCB solids, earlier measurements of (1) the dipole moments of carboranes (A. W. Laubengayer and W. R. Rysz, *Inorg. Chem.* 4, 1513 (1965); V. I. Stanko, et al., *Zhurnal Strukturnoi Khimii* 8, 928 (1967); A. I. Echeistova et al., *Zhurnal Strukturnoi Khimii* 8, 928 (1967), 933 (1967); R. Maruca, et al., *Inorg. Chem* 6, 572 (1967)), and carboranes halogenated at the carbon atoms (V. I. Stanko et al., *Zhurnal Strukturnoi Khimii* 8, id.; A. I. Echeistova et al., *Zhurnal Strukturnoi Khimii* 8, id.; R. Maruca et al., *Inorg. Chem* 6, id.; and (2) the nuclear spin-lattice relaxation times of carboranes (P. Beckmann et al., *J. Chem, Phys.* 72, 4600 (1980); R. K. Harris et al., *Spectrochimica Acta* 44A, 273 (1988;)), combined with applicants' microwave dielectric measurements, have led to applicants' conclusion that the microwave dielectric response of oCB and mMB is principally due to the orientational motion of the molecule and its dipole moment. This conclusion is strongly supported by applicants' finding that the microwave dielectric response for the non-polar pCB is very low, while the responses for oCB and mCB are very high.

The magnitudes of the dipole moments measured for oCB and mCB in a very dry cyclohexane solvent at 25° C. are 4.31±0.08 D and 2.78±0.6 D, respectively (R. Maruca et al., *Inorg. Chem* 6, id.) As expected, the magnitude of the dipole moment measured for pCB in a benzene solvent at 25° C. is 0.0 D (A. W. Laubengayer et al., *Inorg. Chem.* 4, id.). Measurements of the refractive indices of oCB and mCB in a benzene solvent at 25° C. shows that the electronic polarization of oCB and mCB contributes little to their total polarization (R. Maruca et al, *Inorg. Chem* 6, id.). Consequently, the orientational polarization of the molecular dipole dominates the total polarization at radiation frequencies up to the reorientation frequency for the carborane molecule. This frequency is in the GHz range for solid samples of oCB and mCB. P. Beckmann and A. J. Leffler, *J. Chem, Phys.* 72, 4600 (1980); R. K. Harris, J. Bowles, I. R. Stephenson, and E. H. Wong, *Spectrochimica Acta* 44A, 273 (1988).

The reorientation frequency for a polycrystalline sample of oCB was estimated through the measurement of the $^1$H nuclear spin-lattice relaxation time $T_1$ for the sample as a function of temperature (P. Beckmann et al., *J. Chem, Phys.* 72, id.). The reorientation frequency $v_{or}$ is usually assumed to have a simple Arrhenius dependence on temperature $$v_{or}=v_{\infty}\exp(-\Delta E_a/kT) \qquad (1)$$

where $v_{\infty}$ is a temperature-independent frequency, $\Delta E_a$ is the activation energy required for reorientation, k is Boltzmann's constant, and T is temperature. The plot of $\ln T_1$ vs. $T^{-1}$ generates values for $\Delta E_a$ and $v_{\infty}$, which are determined to be $124.8\times10^{-3}$ eV/molecule and $3.57\times10^{12}$ Hz for oCB (P. Beckmann et al., *J. Chem, Phys.* 72, id.). The insertion of these values into Eq. (1) yields $v_{or}=27.7$ GHz at room temperature. The $^{11}$B and $^{13}$C $T_1$'s measured (R. K. Harris et al, *Spectrochimica Acta* 44A, id.) for polycrystalline samples of oCB and mCB are very similar, and so the $v_{or}$ estimate for oCB should be approximately the same for mCB. The value $v_{or}$ implies that electromagnetic radiation applied to a solid sample of oCB or mCB at frequencies near that of $v_{or}$ will approach a resonance condition resulting in large values of $\epsilon_r$ and $\epsilon_i$. This hypothesis is consistent with the dielectric properties measured for oCB and mCB in the 8–12 GHz frequency range (see Table I).

Figure 5:
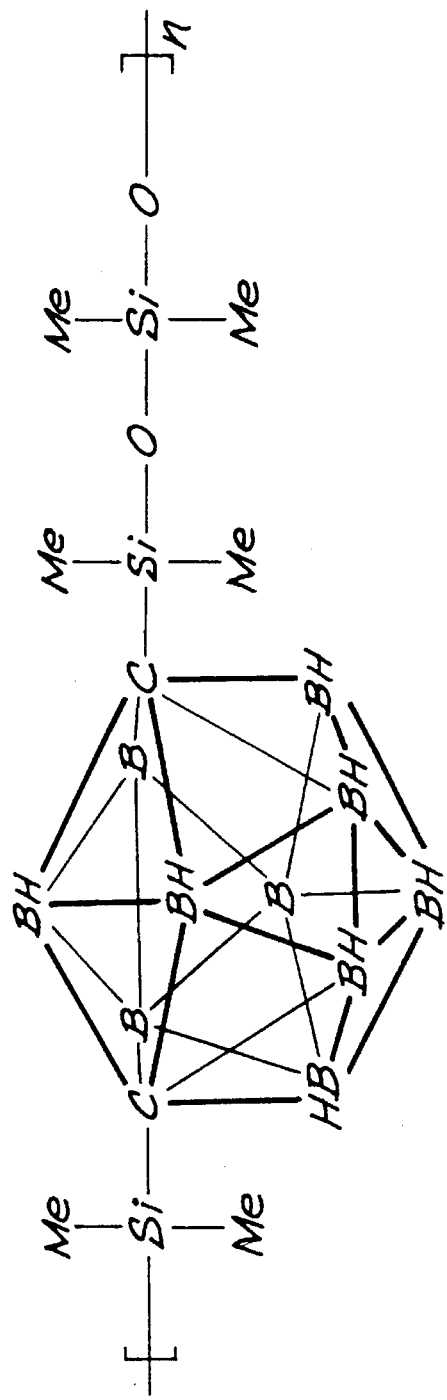
FIG. 5 illustrates the molecular structure of poly(carborane-siloxane).

Additional support for this interpretation of the microwave dielectric properties of oCB and MCB in terms of the orientational motion of the molecular dipole is provided by the measurement of the microwave dielectric properties for the high-temperature adhesive, poly (carboranesiloxane) or PCS. As shown in FIG. 5, the "mCB" cages in PCS are connected to each other via siloxane chains, and therefore are very constrained in their orientational motion. As a result, the $\epsilon_r$ and $\epsilon_i$ for PCS are much less than those for mCB: at 8.5 GHz $\epsilon_r$=2.36 and $\epsilon_i$=0.1 for PCS, while $\epsilon_r$=4.80 and $\epsilon_i$=3.50 at 8.5 GHz for polycrystalline mCB. It is likely that the bonding of the silicon atoms to the carbon atoms in mCB alters the dipole moment of the cage, but this effect on the dielectric properties is felt to be much less than the constraint on the motion of the cage.

The challenge in synthesizing microwave-absorbing materials based on mCB or similar polar cages is to find a host matrix/lattice that will give the cages large orientational mobilities.

The first example of a polymeric host matrix for oCB is a mixture of oCB and poly(methyl methacrylate) or PMMA in a weight percent ratio of 55/45. The $\epsilon_r$=3.0 and $\epsilon_i$=1.3 measured at 8 GHz for the mixture is considerably lower than that measured for polycrystalline oCB ($\epsilon_r$=7.02 and $\epsilon_i$=11.9), but is an improvement over the $\epsilon_r$=2.6 and $\epsilon_i$=0.2 measured at 8 GHz for pure PMMA.

2. Synthesis of Microwave-Absorbing Materials.

Novel microwave-absorbing materials are described that contain polar icosahedral molecular units. These materials not only display high dielectric loss at microwave frequencies, but can be transparent in the visible and IR spectral regions. The major synthetic challenge is the incorporation of the polar icosahedral units into an IR- and visi- ble-transparent host matrix material without severely limiting the orientational mobility of the "microwave-active" units. Two approaches to this incorporation are described. First, blends of polymers, or other host matrices with polar icosahedral molecular units are possible. The units are not covalently bonded to the host matrix in this case. Second, the units can be covalently bonded in a pendant manner to the polymer chain. Single point attachment of the molecules is expected to have the least effect on their orientational mobility.

The microwave dielectric properties of materials containing polar icosahedral molecular units can be engineered not only by modifying the orientational mobility of the microwave-active units, but also by changing their polarities, i.e., dipole moments. For example, it has been shown that the magnitude of the dipole moment for o-carborane could be increased by halogen substitution of the two boron atoms opposite to the carbon atoms (R. Maruca et al., *Inorg. Chem* 6, id.); H. D. Smith et al., *Inorg. Chem.* 4,107 (1965)). This increase in the molecular dipole moment of the carborane molecule is expected to result in an improvement of the microwave dielectric response of a material containing this molecule.

3. Improved Polar Icosahedral Molecular Units.

Figure 6:
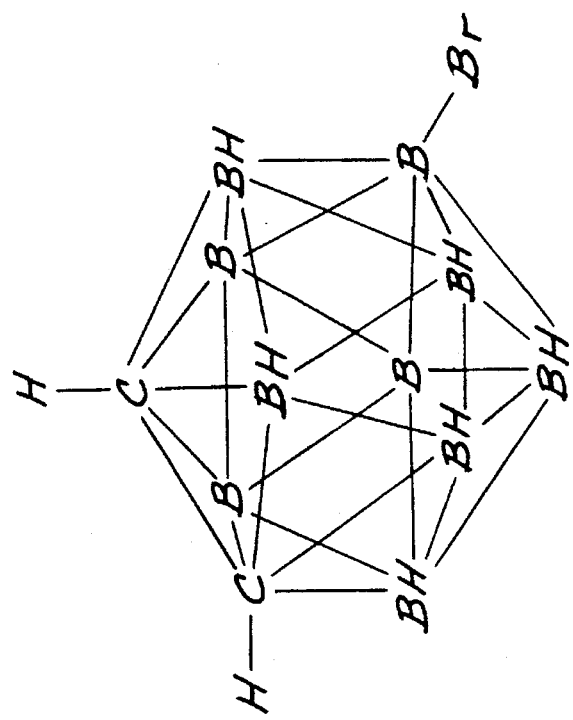
FIG. 6 illustrates the molecular structure of B-bromo carborane.

Three examples of improved polar icosahedral molecular units are described below.

a. The placement of electronegative substituents (e.g., bromine as shown in FIG. 6) on the corborane cage borons opposite to the carbons has been shown to increase the dipole moment of the cage (R. Maruca et al., *Inorg. Chem* 6, id.; H. D. Smith et al., *Inorg. Chem.* 4, id.).

Figure 7:
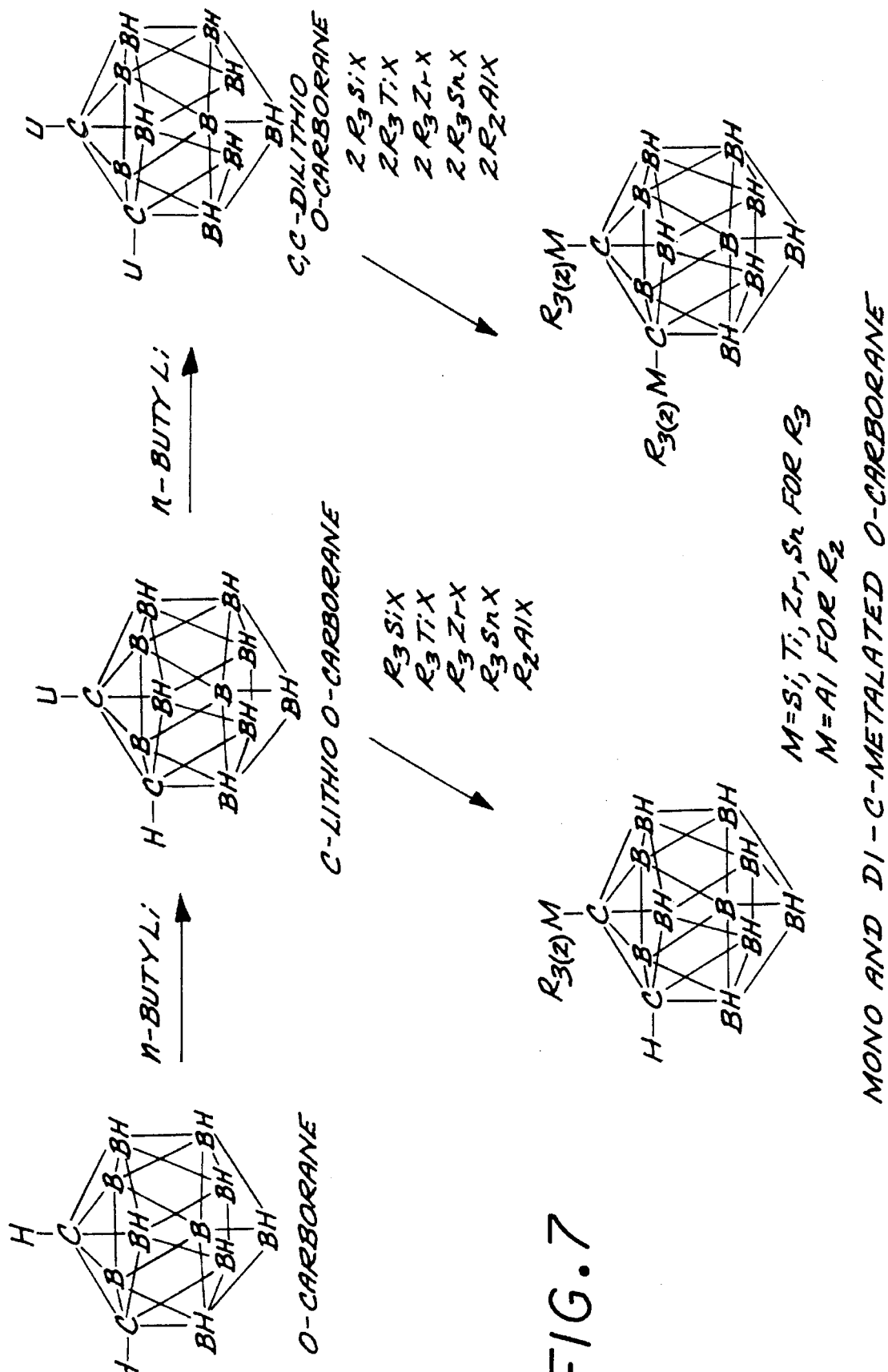
FIG. 7 illustrates an exemplary method for synthesizing mono and di-C-metalated o-carborane.

Other moieties may also be selected, including a phosphate ester, ion, or sulfate. The bromination of carborane at the cage borons has been accomplished by electrophilic attack (H. D. Smith et al., *Inorg. Chem.* 4, id.). Other electrophilic reagents might be used to create other electronegative substituents on the carborane cage borons. Interestingly, these substituents will also decrease the overall flammability and smoke generating characteristics of the carborane. Therefore, derivatization of the cage borons via electrophilic substitution is a preferred approach to improve both the microwave dielectric and thermo-oxidative properties of carborane-like molecules.

b. The placement of electropositive groups on carborane ring carbons will also increase the dipole moment. Very few good examples of this are seen in the literature. However, possibilities that exist include the C-silicon (and other like atom, for example, titanium, zirconium, tin or aluminum). In the case of ortho-carborane, these derivatives can be made by the reaction shown in FIG. 7. In FIG. 7, "R" is selected from the group consisting of a C1 to C6 alkyl group, an unsubstituted aryl group and a substituted aryl group. "X" is a suitable leaving group to nucleophilic attack. For example, X is a halogen (F, Cl, Br); in practice, X is typically Cl.

FIG. 7 describes the synthesis of air and hydrolytically (environmentally stable) stable C-metalated o-carborane molecules. For the case of the mono-C-metalated derivatives, they can be made by dissolving o-carborane in a suitable dry, oxygen free solvent (for example diethylether, 10% by weight). Into the solution is added, for example, n-butyllithium in hexane (1 equivalent). After a period of time to complete the reaction, for example, one hour, the solution of lithiated o-carborane is added to a solution of the substituted metal X compound where R is the substituted part, defined above, X is a suitable leaving group, defined above and M is selected as silicon, titanium, zirconium, tin or aluminum. After the reaction is complete, for example, one hour, the solution is filtered to remove the MX salt, the solvent is removed, for example, by simple distillation or rotary evaporation, and the product is isolated via distillation in the case of liquids, or crystallization for the case of solids.

For the case of the di-C-metalated derivatives, they can be made by dissolving o-carborane in a suitable dry, oxygen free solvent, for example diethylether, 10% by weight. Into the solution is added, for example, n-butyllithium in hexane (2 equivalents). The resulting mixture is filtered via inert atmosphere techniques, for example, in a dry box, to isolate the solid di-lithio salt. The solid dilithio salt is added to an excess (greater than 2 equivalents) of a solution of the substituted metal X compound where R is the substituted part, defined above, X is a suitable leaving group, defined above, and M is selected as silicon, titanium, zirconium, tin or aluminum. The solution is filtered to remove the MX salt, the solvent is removed, for example, by simple distillation or rotary evaporation, and the product is isolated via distillation in the case of liquids, or crystallization for the case of solids.

Figure 8:
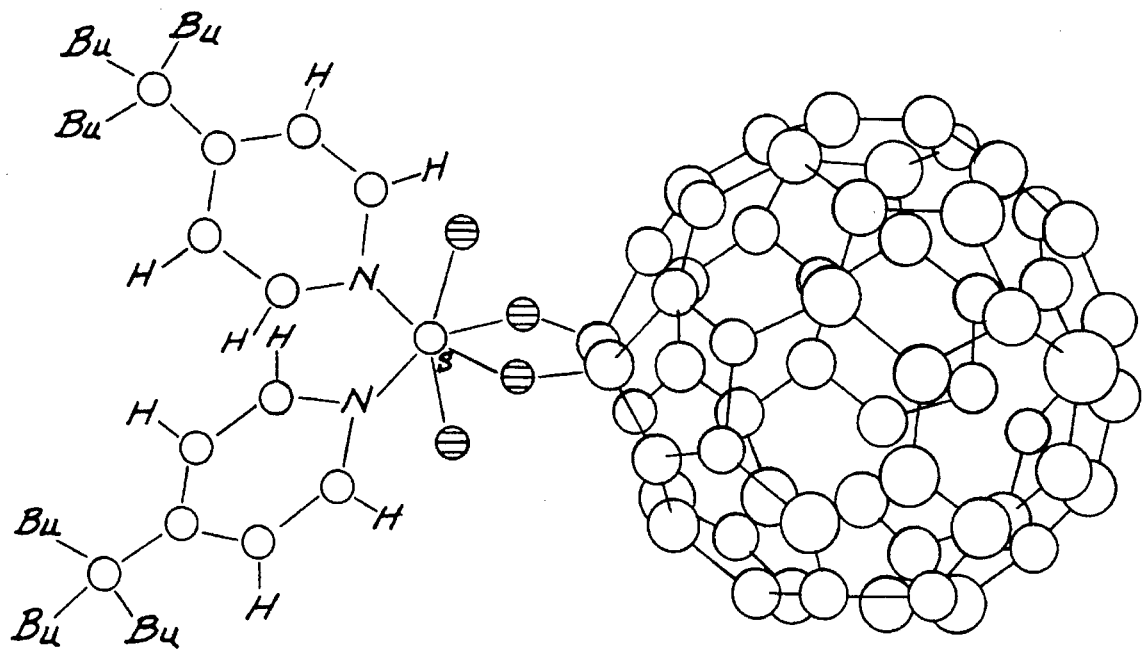
FIG. 8 illustrates the chemical structure of $(t-B_uC_5H_4N)_2 O_sO_4C_{60}$.

The use of derivatized o-carborane molecules give the synthetic chemist another method of increasing the relative dielectric response and improving other properties of carborane-like molecules.

c. The functionalized $C_{60}$ or $C_{70}$ icosahedral "Buckminsterfullerenes" represent another class of molecules that may provide microwave dielectric responses similar to the carboranes. An example of a functionalized "Buckminsterfullerene" that has a dipole moment is the molecule $(t-B_uC_5H_4N)_2 \, O_sO_4C_{60}$, shown in FIG. 8. The synthesis of this molecule is described in "Crystal Structure of Osmylated $C_{60}$: Confirmation of the Soccer Ball Framework," J. M. Hawkins et al., *Science* *252, 312–313* (1991).

Synthetic methodology therefore exists to create dipoles on this cage ring structure. The dipole is expected to have outstanding mobility in the matrix due to the large cage ring spaces, and because dipole-dipole forces are the principal intermolecular interactions between the cages.

4. Host Matrices.

The blending of o-carborane and similar polar icosahedral molecular units into a host matrix is a particularly simple method to create high loss materials. Three approaches are described: (1) blending into organic polymers, (2) inorganic oxide glasses derived from sol-gel chemistry, and (3) gel/foam-type derivatives. These approaches will give a variety of different materials with minimal effort.

a. Organic Polymers

Both high modulus organic polymer glasses and low modulus materials (rubbers, liquids) can be used as host matrices. Candidate host matrices should be as compatible as possible with the polar icosahedral molecules to keep phase separation to a minimum. The carborane-siloxane rubber is a good candidate for rubber phases. Also included are normal rubber (poly cis-isoprene) and silicone rubbers and fluids.

High modulus organic polymers can be blended with the polar icosahedral molecules, e.g., poly-styrene, poly-carbonate (e.g., the material sold under the trademark LEXAN), and poly-acrylates. The blending procedure involves simple mixing of the host matrix material with the polar icosahedral molecules.

b. Inorganic Oxide Glasses

Polar icosahedral molecules can also be loaded into inorganic oxide glass matrices via a sol-gel approach. This loading can be accomplished through (1) dissolving the molecules into the sol containing the inorganic oxide precursors, (2) vapor deposition of the molecules into the sol-gel-derived inorganic oxide matrix, or (3) covalent attachment Of the molecules to the matrix.

An example of the vapor deposition of polar icosahedral molecules into a sol-gel-derived inorganic oxide glass matrix is provided in the related application, Ser. No. 870,532, filed Apr. 17, 1992 entitled "Broadband Absorbers of Electromagnetic Radiation Based on Aerogel Materials, and Method of Making the Same," by Brian M. Pierce, T. K. Dougherty, N. H. Harris, J. R. Chow, and assigned to a common assignee with the present application. The entire contents of this application are incorporated herein by this reference. In this application, the vapor deposition of ortho- and metacarborane into a sol-gel-derived silica aerogel is described. This procedure can also be used to load a sol-gel-derived silica aerogel with other polar molecules such as water, propylene carbonate, methanol and nitromethane.

An example of the covalent attachment of polar icosahedral molecules to a sol-gel-derived inorganic oxide glass matrix is described below for o-carborane and silica. First, a derivative of o-carborane is produced that is capable of being covalently attached to the silica sol-gel:

(1) Dissolve o-carborane in a suitable dry, oxygen free solvent, e.g. diethylether, 10% by weight.

(2) Into the solution is added, e.g., n-butyllithium in hexane (1 equivalent).

(3) After one hour the solution of lithiated o-carborane is added to a solution of tetraethoxyl silane (TEOS) to produce the C-silicon-trialkoxy-o-carborane derivative. After the reaction is complete, the solution is filtered to remove the lithium ethoxide byproduct and the solution is concentrated and the product isolated as described in the above example.

Figure 9:
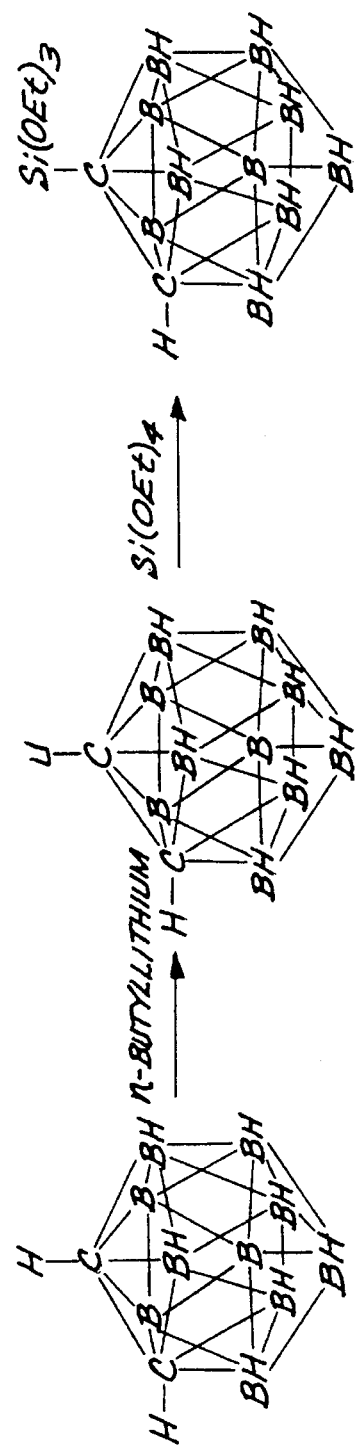
FIG. 9 illustrates the synthesis of a C-silicon-trialkoxy-o-carborane.

The above sequence of reactions is summarized in FIG. 9.

After producing the C-silicon-trialkoxy-o-carborane derivative, the derivative is covalently attached to a sol-gel-derived silica matrix following the procedure described in the related application, "Broadband Absorbers of Electromagnetic Radiation Based on Aerogel Materials," attorney document number PD 92027.

c. Gel and Foams

The gel approach involves the production of ion-stabilized gels of crosslinked polymers. The gel-forming material is propylene carbonate. In a typical gel-forming reaction, the diacrylate monomer, propylene carbonate and photoinitiator are stabilized by solvation with a salt. The mixture is polymerized via irradiation of UV light to give the crosslinked gel. These materials are visibly transparent gels and represent an interesting mobile phase for polar, icosahedral molecules. These molecules can be loaded into the gels to create new materials with an interesting microwave dielectric response. Making visible-and IR-transparent polar dielectrics is possible with this technique.

Second, foams can also be employed in making loaded polymer materials. Millar et al. has described the synthesis of macroreticular resins (J. R. Millar et al., *J. Chem. Soc.*, Pt. 1, 218 (1963)). In these experiments, a mixture of styrene and divinyl benzene are polymerized in a poor solvent. Out of these reactions come low density materials which are porous and have high surface area. These materials are used in standard commercial ion exchange resins. These materials can be loaded with polar, icosahedral molecules to increase the dielectric response. The molecules can be added either during or after the polymerization. These materials are intriguing because the low dielectric pores can be mixed with the high dielectric polar molecules in a controlled fashion. In this way, materials with refractive index gradients can be prepared to decrease the front-surface reflection of electromagnetic radiation. These materials might also be made by loading carborane-type materials into other foam matrices. Loaded foams can provide for tailorable dielectric properties with little new chemistry involved.

d. Carborane Polymers

The preceding sections describe the techniques in loading polar, icosahedral molecules into a variety of organic and inorganic matrices. These techniques incorporate simple approaches to create new dielectric materials. However, there are possible problems associated with phase separation and diffusion of the polar isosahedral molecules out of the matrix. Another approach is the covalent attachment of polar, icosahedral molecules to polymer matrices. This approach is presently considered to be the best solution to make optically clear and environmentally stable materials of this type. This approach is discussed below.

In order to create different materials with polar icosahedral molecules covalently attached to the host matrix, standard chemical synthetic methods can be used on the polar icosahedral molecule carborane. Two different techniques can be used to make the materials: 1) carborane cages are grafted onto a polymer matrix, or 2) monomers with carborane covalently attached can be synthesized and then polymerized or copolymerized in a standard manner to produce the materials. These approaches are discussed in the next sections.

1. Grafting

The grafting of a functionalized o-carborane to a reactive polymer chain is described. Although many alternative chemistries can be used, a lithiated carborane anion for a nucleophilic replacement of a reactive polymer chain is described here. One such alternative is shown in FIG. 10.

Figure 10:
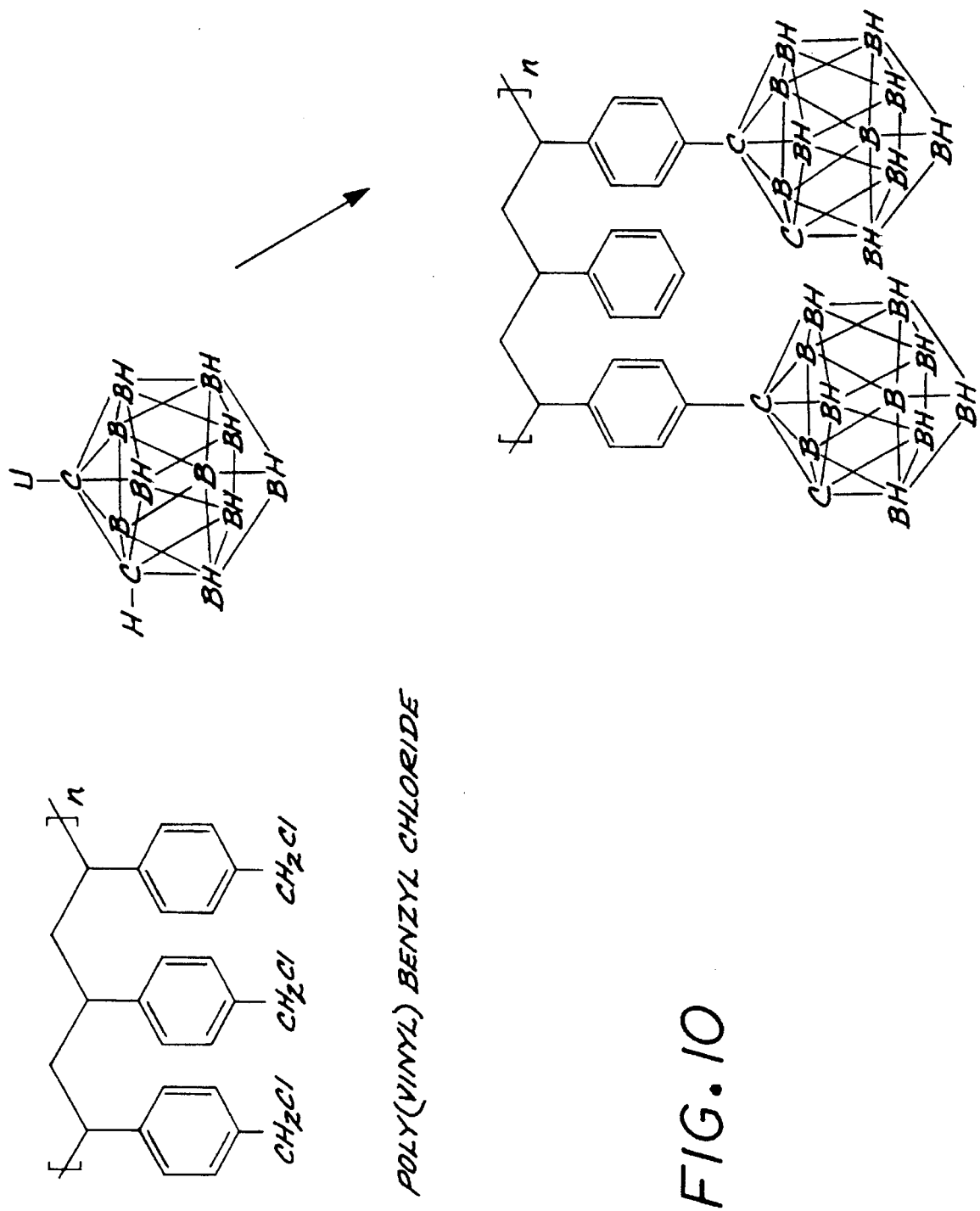
FIG. 10 illustrates an exemplary method for synthesizing poly(vinyl benzyl-o-carborane) by graft reaction of lithio carborane onto poly(vinylbenzylchloride).

As shown in FIG. 10, o-carborane is dissolved in a suitable dry, oxygen free solvent, for example, diethylether, 10% by weight. Into the solution is added, for example, n-butyllithium in hexane (1 equivalent). After one hour, the solution of lithiated o-carborane is added to a solution of poly(vinylbenzylchloride). The amount of poly(vinylbenzylchloride) can be adjusted to alter the amount of o-carborane grafted and to alter the dielectric properties. The solution is filtered to remove the LiCl salt, and the grafted o-carborane onto the poly(vinylbenzylchloride) can be isolated by evaporation of the solvent.

By varying the stoichiometry of the displacement reaction, different concentrations of the o-carborane on the polymer chain can be produced. These variants will have different physical and dielectric properties and be useful for making high microwave dielectric loss materials.

2. Polymerization and Copolymerization

Figure 11A:
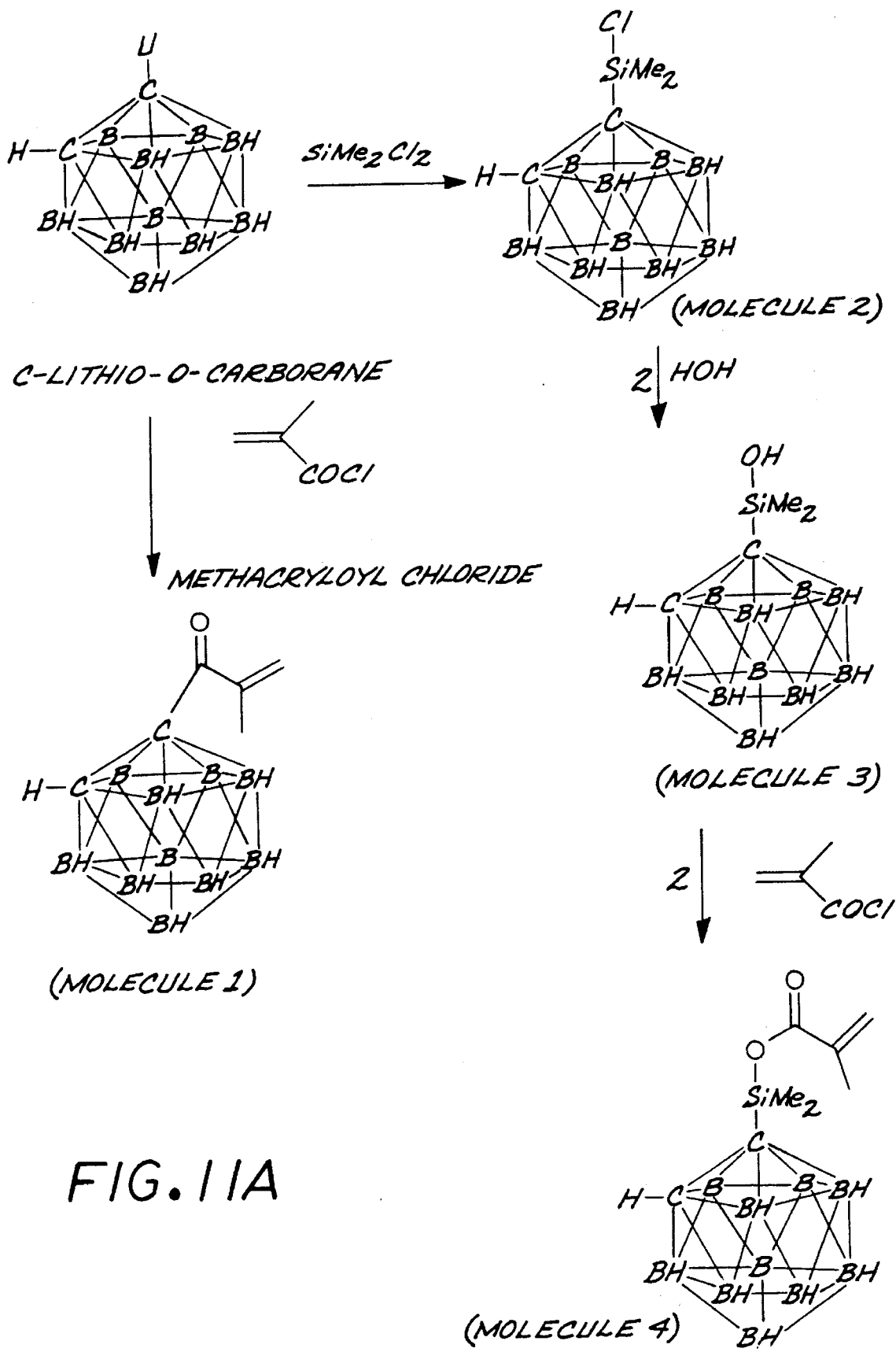
FIGS. 11A–11B illustrate synthesis techniques for the synthesis of polymers of vinyl carborane and acrylate monomers of o-carborane.
Figure 11B:
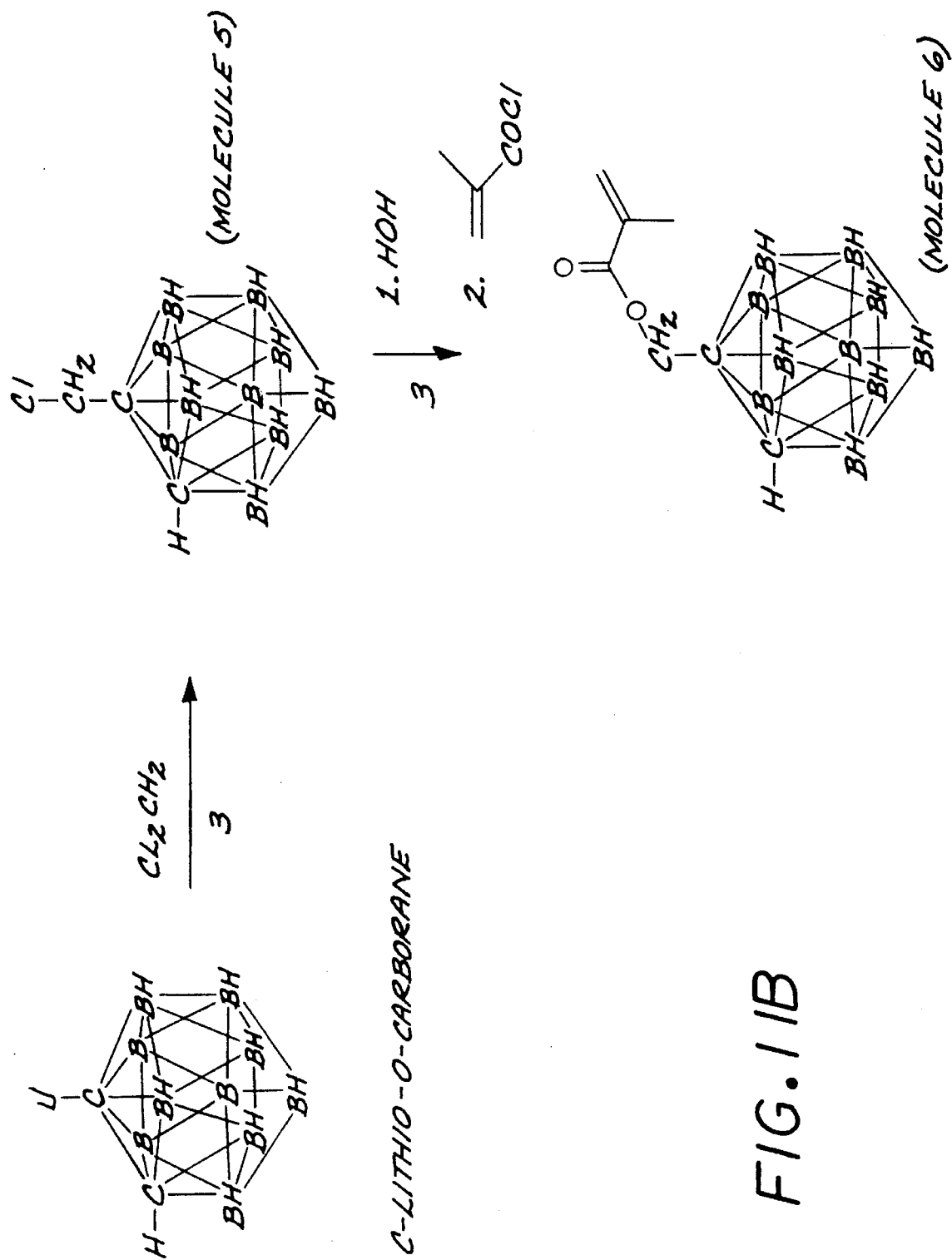

Two approaches to polymerization are described. First, it is possible to synthesize polymers of vinyl carborane, as described in U.S. Pat. No. 3,109,031, "Organoboron Polymers and Process of Making Same," H. L. Goldstein et al. The second approach is the synthesis of three acrylate monomers of o-carborane: C-carbon, C-silicone, and C-carbonyl moieties. These alternatives provide the possibility of changing and improving the dipole moment of the carborane and therefore the dielectric response of the materials. These molecules could be made by standard synthetic techniques as shown in FIGS. 11A and 11B. They are all formed from the lithiated o-carborane.

The synthetic process of FIGS. 11A and 11B includes the following steps. The o-carborane is dissolved in a suitable dry, oxygen free solvent, for example diethylether, 10% by weight. Into the solution is added, for example. n-butyllithium in hexane (1 equivalent). The lithiated o-carborane is reacted with:

Arrow 1 reaction (FIG. 11A): methacryloyl chloride. The C-methacrylo-o-carborane (MOLECULE 1) thus formed is isolated by filtration and concentration;

Arrows 2 reaction (FIG. 11A): $SiMe_2Cl_2$. The $SiMe_2Cl_2$ derivative (MOLECULE 2) is isolated via filtration and concentration as described before. This is hydrolyzed, for example in a mixture of THF (tetrahydrofuran) and water, to give the $SiMe_2OH$ derivative (MOLECULE 3) which can be reacted in base, for example, pyridine, with methacryloyl chloride to give the C-dimethylsilyl-methacryloxy-o-carborane (MOLECULE 4) isolated by filtration and concentration;

Arrows 3 reaction (FIG. 11B). React with dichloromethane to give the molecule shown (MOLECULE 5) which can be hydrolyzed then reacted with methacryloyl chloride to give C-methyl-methacryloxy-o-carborane (MOLECULE 6).

This is just one exemplary way to make the molecules shown.

MOLECULES 1, 4, 6 can then be polymerized or copolymerized (with other vinyl monomers) to make polymers containing polar icosahedral molecules attached to the polymer chain. They can be polymerized or co-polymerized by heating in a suitable solvent, for example, toluene at 80 degrees C., in the presence of a free radical initiator, for example, azibisisobutyronitrile (AIBN), for a period of time, for example, eight hours. In the case of co-polymers they will be polymerized in the presence of another vinyl monomer, for example, styrene. Removal of solvent gives the materials.

Applications of microwave-absorbing material containing polar icosahedral units

There are several applications of microwave-absorbing materials containing polar icosahedral units. One application is coatings for decreasing the observability of objects in the microwave-millimeter wave part of the electromagnetic spectrum. The visible and IR transparencies of the polar carboranes make coatings containing these molecules useful in reducing the observability of visible and IR windows in the microwave-millimeter wave spectrum. An additional exemplary application is to use polar icosahedral molecular units as additives that absorb microwave energy and assist in the microwave processing of polymers, e.g., the vulcanization of rubber, the crosslinking of epoxy resins, the curing of polymides and elastomers, the phase control of thermoplastic toughened epoxies, and the heating of thermoplastics.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A microwave-energy-absorbing material, comprising orientationally mobile, polar icosahedral molecular units as the source of dielectric loss at microwave frequencies, and a host matrix, said polar icosahedral molecular units blended with said matrix, wherein said molecular units comprise polar carboranes with electronegative substituents on the carborane cage borons opposite to the carbons of said molecular units, wherein said substituent is bromine.

2. A microwave-energy-absorbing material, comprising orientationally mobile, polar icosahedral molecular units as the source of dielectic loss at microwave frequencies, and a host matrix, said polar icosahedral molecular units blended with said matrix, wherein said molecular units comprise polar carboranes with electronegative substituents on the carborane cage borons opposite to the carbons of said molecular units, wherein said substituent is a phosphate ester, ion or sulfate.

3. A microwave-energy-absorbing structure comprising an ion-stabilized gel of crosslinked polymers, into which is loaded polar icosahedral molecules as the source of dielectric loss at microwave frequencies.

4. The structure of claim 3 wherein said gel is synthesized from propylene carbonate in a gel-forming reaction, wherein a diacrylate monomer, propylene carbonate and a photoinitiator are stabilized by solvation with a salt, and the resulting mixture is polymerized via irradiation of ultraviolet light to provide the crosslinked gel.

5. A microwave-energy-absorbing material comprising a foam, wherein said foam comprises macroreticular resins, loaded with polar icosahedral molecular units to increase the dielectric response, wherein said resins are synthesized by the polymerization of a mixture of styrene and divinyl benzene in a poor solvent.

6. A microwave-energy-absorbing material, comprising orientationally mobile, polar icosahedral molecular units as the source of dielectric loss at microwave frequencies, and a host matrix comprising poly cisisoprene, said polar icosahedral molecular units blended with said matrix, wherein said molecular units comprise polar carborane molecules.

7. The material of claim 6 wherein said molecular units comprise ortho-carborane molecular units.

8. The material of claim 6 wherein said molecular units comprise meta-carborane molecular units.

9. A microwave-energy-absorbing material, comprising orientationally mobile, polar icosahedral molecular units as the source of dielectric loss at microwave frequencies, and a host matrix comprising silicone rubber, said polar icosahedral molecular units blended with said matrix, wherein said molecular units comprise polar carborane molecules.

10. The material of claim 9 wherein said molecular units comprise ortho-carborane molecular units.

11. The material of claim 9 wherein said molecular units comprise meta-carborane molecular units.

12. A microwave-energy-absorbing material, comprising orientationally mobile, polar icosahedral molecular units as the source of dielectric loss at microwave frequencies, and a host matrix comprising a high modulus organic polymer blended with said polar icosahedral molecules, said polar icosahedral molecular units blended with said matrix, wherein said molecular units comprise polar carborane molecules.

13. The material of claim 12 wherein said molecular units comprise ortho-carborane molecular units.

14. The material of claim 12 wherein said molecular units comprise meta-carborane molecular units.

15. The material of claim 12 wherein said high modulus organic polymer comprises poly-styrene.

16. The material of claim 12 wherein said high modulus organic polymer comprises polycarbonate.

17. The material of claim 12 wherein said high modulus organic polymer comprises a poly-acrylate.

* * * * *